United States Patent [19]

Banbury

[11] Patent Number: 4,560,233
[45] Date of Patent: Dec. 24, 1985

[54] COLOR HEAD UP DISPLAY SYSTEM

[75] Inventor: John R. Banbury, Fleet, England

[73] Assignee: The Secretary of State for Defence in Her Britannic Majesty's Government of the United Kingdom of Great Britain and Northern Ireland, London, England

[21] Appl. No.: 577,369

[22] Filed: Feb. 6, 1984

[30] Foreign Application Priority Data

Feb. 9, 1983 [GB] United Kingdom ............... 8303619

[51] Int. Cl.⁴ ............................................. G02B 5/32
[52] U.S. Cl. .................. 350/3.7; 340/705; 340/980; 350/3.72; 350/174
[58] Field of Search ............. 340/702, 705, 980; 350/3.7, 3.72, 174

[56] References Cited

U.S. PATENT DOCUMENTS

| | | | |
|---|---|---|---|
| 2,747,460 | 5/1956 | Calvi | 350/174 |
| 3,848,974 | 11/1974 | Hushing et al. | 350/174 |
| 3,915,548 | 10/1975 | Opittek et al. | 350/3.72 |
| 3,940,204 | 2/1976 | Withrington | 350/3.72 |
| 4,261,635 | 4/1981 | Freeman | 350/3.7 |
| 4,407,564 | 10/1983 | Ellis | 350/3.7 |
| 4,457,579 | 7/1984 | Thylén | 350/3.72 |
| 4,490,745 | 12/1984 | Erickson et al. | 340/705 |

FOREIGN PATENT DOCUMENTS 2123657  2/1984  United Kingdom ............... 350/174

OTHER PUBLICATIONS

J. V. Culver et al., "Two Color Optical Alignment System", *IBM Technical Disclosure Bulletin*, vol. 17, No. 10, Mar. 1975, p. 2983.

Primary Examiner—John K. Corbin
Assistant Examiner—William Propp
Attorney, Agent, or Firm—Cushman, Darby & Cushman

[57] ABSTRACT

A head up display system including a light emissive object at an object plane and a collimator and combiner to provide a collimated image for viewing at an eye plane overlaid on a view through the combiner. The object emits light in at least two chromatically separated emission wavebands and by a diffractive optical element in the light path from object plane to eye plane having narrow band reflection characteristics at each emission wavelength.

11 Claims, 2 Drawing Figures

COLOR HEAD UP DISPLAY SYSTEM

BACKGROUND OF THE INVENTION

This invention relates to head up display systems, and in particular to high accuracy head up display systems in which an image may be superimposed exactly over an outside view such as a weapon aiming marker for an aircraft.

A conventional head up display (HUD) system includes a light emissive object (usually a cathode ray tube (CRT)) situated at an object plane and optics, including a collimator and a combiner for providing a collimated image of the object at an image plane for viewing at an eye plane combined with an outside view through the combiner. A feature of HUD systems design is the close attention which must be paid to aberrations within the optics to ensure that an accurate and correctly collimated image of the object is provided over the full field of view. This is particularly important in systems where images are required to be accurately placed with respect to the outside world, such as aircraft weapon aiming or way point markings, in addition to data presentation.

Use of head up displays has proved so important in military aviation, that the accuracy and quality of the display are now regarded as among the limiting factors of operational performance. This importance has led to a desire to present an increasing amount of information by means of HUD, and display clutter due to the large amount of information displayed is now a major problem in the art. In order to provide a solution to this problem the use of color attention cues has been suggested.

Existing head up display systems concentrate on providing an accurate image from a monochrome source, so objects producing color displays would give rise to collimation and positional errors with observer head movement. Full color correction would involve increased weight and cost and is not considered practical and hence all known electronic head up display systems presently installed in aircraft are monochrome only in that the optics are optimally accurate at a single wavelength.

If an attempt is made to use a monochrome only system with a colour object because the system does not have full chromatic correction the system focal length will change by a small amount for light of wavelengths away from the wavelength for optimum accuracy. Hence the system will have inadequate accuracy and an incorrect image plane which will be evident with observer head movement. Collimation errors which result in movement of the image relative to the outside view with head movement clearly rule out any display of ground locked images such as sights and target markers. Such errors are particularly damaging if present in high performance systems with a large exit pupil, in which a design aim is to tolerance of head movement within the exit pupil volume.

SUMMARY OF THE INVENTION

According to the present invention a head up display system includes a light emissive object at an object plane, optics including a collimator and a combiner arranged to provide a collimated image of the object for viewing at an eye plane overlaid on a view through the combiner, the optics being arranged for optimum accuracy over a narrow band of wavelengths characterised in that the ojbect emits light in at least two chromatically separated emission wavebands and by a diffractive optical element in the light path from object plane to eye plane having narrow band reflection characteristicsat each emission waveband.

Preferably the relative intensity of light emitted in each emission waveband may be controlled to provide intermediate colors. This may be advantageously achieved by restricting the number of chromatically separated emission wavebands (each giving a distinct color component), emitting in only one waveband at a time, and varying the relative intensity of each waveband emission. Advantageously an object is formed at a different magnification as light in each waveband is emitted, so that components of the complete colour image are accurately overlaid. Different geometrical correction may similarly be applied.

Preferably the diffractive optical element exhibits a different focal length at each emission waveband such that light in each waveband from the object forms a correctly collimated color image at the image plane, and the rest of the optical system being of conventional monochrome design. Preferably an element exhibiting different focal lengths is constructed by recording spaced apart fringe patterns in accordance with known holographic techniques. The diffractive optical element may be a discrete component, or incorporated in the collimator or combiner. Multiple elements may be used to achieve overall accuracy at each emission wavelength.

The emission wavebands may be at two contrasting color, or alternatively three primary color such that intermediate color may be provided by additive mixing of the primaries. The light emitting object may be a cathode ray tube, preferably having a phosphor of the penetron type. Advantageously emission is restricted to the emission wavebands and intermediate color achieved by varying the writing speed or the electrical drive to the CRT when each penetraton phosphor component is energized. If required, different magnifcation and geometrical scan correction may be applied to the CRT as each color is written.

BRIEF DESCRIPTION OF THE DRAWINGS

In order that features and advantages of the present invention may be appreciated embodiments will now be described by way of example only and with reference to the accompanying diagrammatic drawings, of which

DESCRIPTION OF THE PREFERRED EMBODIMENTS

Figure 1:
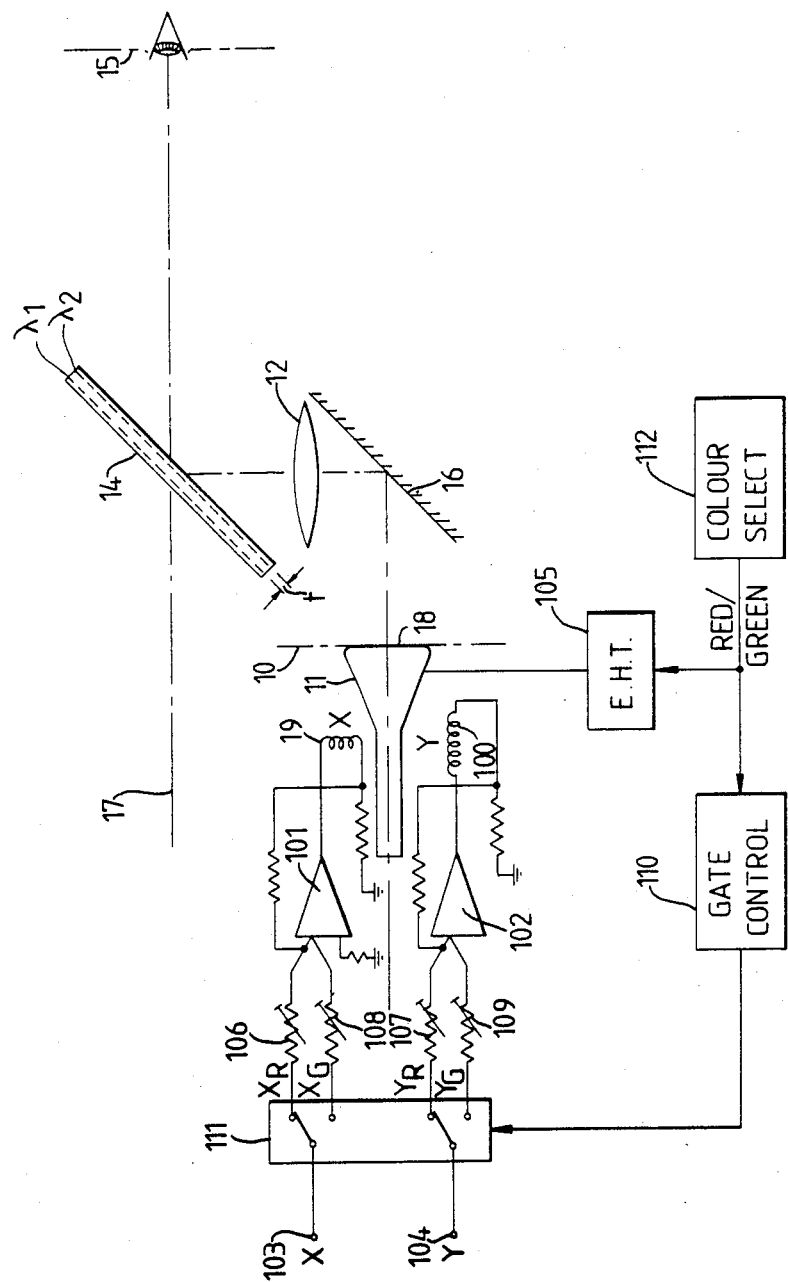
FIG. 1 and FIG. 2 represent head up display systems in accordance with the present invention.

In a head up display system (FIG. 1) a light emissive object is provided at an object plane 10 by a CRT 11. Optics, including a collimator 12 and combiner 14 provide a collimated image at infinity viewable from eye plane 15 overlaid on a view 17 through the combiner 14. The light path from object plane 10 to eye plane 15 is folded by a folding mirror 16 for convenience.

The optics is designed for optimum accuracy over a particular object emission waveband and as such the detail of the collimator 12 is known. For claritiy collimator 12 is shown as a single simple lens although in practice a multi-element lens will be required to provide adequate correction.

Emission of light from CRT 11 is by a phosphor of the known penetron type in which different phosphor components may be energized by application of different extra high tension (eht) voltages to the tube. CRT 11 thereby emits light in two chromatically separated wavebands (that is in two different colors). In a conventional HUD the combiner 14 may be a plane sheet of glass, however in accordance with the present invention combiner 14 is a diffractive optical element having reflective characteristics at both CRT emission wavebands. The reflective characteristics are provided by fringe patterns $\lambda_1$ for the first emission wavelength and $\lambda_2$ for the second emission wavelength of the CRT 11, recorded in combiner 14 by holographic techniques.

Methods for recording fringe patterns providing narrow band reflective characteristics at specified wavebands are known in the art of holography. In combiner 14, two such patterns are formed separated by a distance t. The band of fringe pattern $\lambda_1$ is specific to the first emission waveband of CRT 11, and the band of fringe pattern $\lambda_2$ to the second. The separated fringe bands in combiner 12 exhibit a different effective focal length over each of the emission wavebands such that a correctly collimated image is formed in a single image plane at infinity by light in each waveband. The chromatic separation of the emission wavebands results in a correctly collimated colour image at infinity viewable from eye plane 15.

CRT 11 has a penetron phosphor comprising two components a first component, gadolinium oxysulphide: terbium (P43), having an emission waveband around 545 nm (green) and a second component, yttrium oxide: europium, having an emission waveband around 613 nm (red). A way in which intermediate colors between the two emission wavelengths may be obtained with a phosphor of the penetron type is known in the art. However, in the present embodiment the desired color is not obtained by the known method of a progressive variation of eht voltage; instead two specific eht values are used with appropriate scan amplitude, geometrical polynomial correction and focus voltage, as will be described below. Intermediate colors may be achieved by changing either the CRT electrical drive voltage or the writing speed of the electron beam within the CRT in order to vary the relative intensities of red and green in the displayed image. In this way at any instant in time the light emitted from the CRT is either in the first emission waveband, or the second emission waveband and, due to the properties of the combiner described above, light of these wavelengths will form an accurate, collimated color image. The CRT drive electronics will now be described in more detail.

An object is formed on face 18 of CRT 11 by deflection of an electron beam (not shown) by means of two orthogonal windings 19,100 providing X and Y deflection of the beam respectively. The windings 19,100 are driven by amplifiers 101,102 in response to X and Y driven signals applied at inputs 103,104 respectively. In accordance with known methods of operating penetron phosphors the eht applied to the CRT determines the color emitted. Generator 105 provides eht to activate the phosphor to emit in chromatically separated wavebands only (red or green). The property of a penetron phosphor of emitting intermediate colors with varying eht is not used. Because of the slightly different focal length for reflections from fringes $\lambda_1$ and $\lambda_2$ of combiner 14, the images in red and green although correctly collimated will be subject to slightly different magnifications. This magnification difference is compensated by applying different gains to drive amplifiers 101 and 102 during red and green emission. The required magnifications can be set by adjustment of gain controls 106, 107 for red and gain controls 108,109 for green in X and Y deflections respectively. The gain selection is controlled by gate control 110 activating gates 111. Generator 105 and gate control 110 are synchronously controlled by color selector 112, so that the correct magnification is applied to emissions at each color. In this way color objects having red and green components can be formed by altering the writing time of green relative to red which will be accurately overlaid to provide images of intermediate color. Timing is controlled by color selector 112. Thus an accurate image in any required color in the range red to orange to yellow to green may be presented correctly collimated and overlaid with respect to outside view 17 since specific magnification correction has been applied for emission at each discrete color.

In conventional HUD systems partial correction for overall geometrical errors may be applied electrically to the CRT by means of polynomial terms introduced to the scan drive. In the present invention different correction may be applied for each emission waveband by switching the scan drive circuitry synchronously with the eht color drive from color selector 112 in a way similar to that for magnification correction as described above so that different polynomial correction is introduced for emission at each discrete color.

The optical principle of operation of the above embodiment will be understood by those skilled in the art as conventional design considerations are applied in that the optics are corrected for optimum accuracy at a single emission waveband as in a monochrome HUD system. This is an important feature of the present invention since by replacing the monochrome CRT of a conventional HUD system with a CRT having a phosphor of the penetron type and introducing a diffractive optical element having matched narrow band reflection characteristics, preferably by replacing the conventional combiner with a diffractive element such as combiner 14 (FIG. 1), an existing monochrome installation may be converted to color.

There is currently interest in the use of red for HUD presentation at night as it is thought to permit improved perception in darkness. This is presently achieved by placing a red filter over a green CRT, but unfortunately results in loss of collimation and accuracy as the HUD system optics is being operated at a waveband well separated from the waveband for optimum accuracy. It will be realised that in accordance with the present invention a HUD system may be provided for operation with accuracy in two alternative color only such as green and red.

A further embodiment will now be described also by way of example only so that it will be appreciated that the present invention may be applied to the wide field of view, large exit pupil HUD systems currently under development. A characteristic of these wide field of view systems is that they have a projected porthole, that is the exit pupil of the system is not within the equipment but projected to a plane close to the observer's eye by means of a relay lens. A useful review of wide field of view systems is to be found in the proceeding of the AGARD Conference on Advanced Avionics and the Military Man/Machine Interface, paper No 32, *Blackpool* April 1982. In wide field of view HUD systems full optical correction over the full field of view and exit pupil is difficult to achieve even in monochrome, and fully corrected monochrome systems represent the state of the art.

Figure 2:
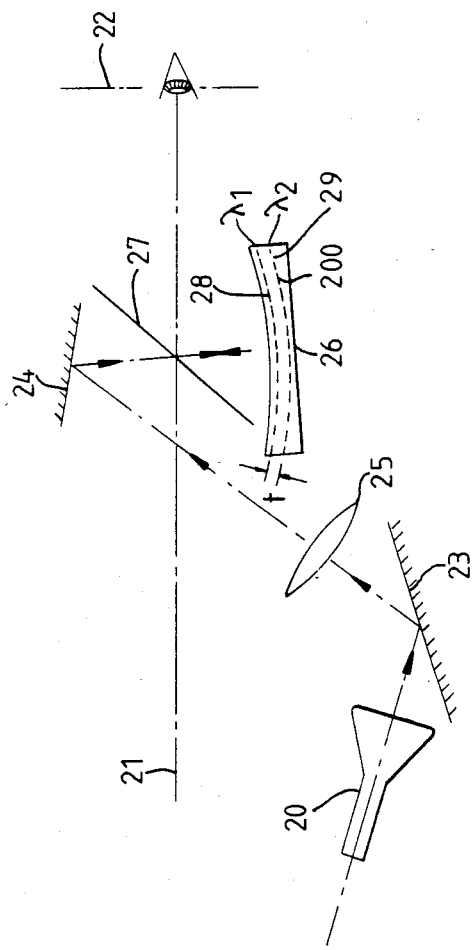

In a wide field of view projected porthole HUD (FIG. 2) an image from a CRT 20 having a phosphor of the penetron type is overlaid on an outside view 21 from an eye plane 22 by means of folding mirrors 23,24 relay lens 25, collimator 26 and combiner 27. The phosphor emits in two chromatically separate wavebands $\lambda_1$ and $\lambda_2$. A diffractive optical element having narrow band reflective characteristics at each emission waveband is included in the image to object path formed as fringe patterns 28,29 in collimator 26. The fringe patterns are matched to wavebands $\lambda_1$ and $\lambda_2$ respectively as described above and spaced apart by distance t. Curvature of substrate 200 and/or diffractive optical power is arranged such that images formed by light in each emission waveband are accurately collimated. Small magnification and geometry corrections are achieved by electronic drive changes for time sequential writing in each discrete color as already described. It will be appreciated that an accurate color image may thus be presented in a wide field of view system without recourse to full color correction of the HUD optics.

The color which can be provided are limited only by the emission wavebands available from existing high luminance, rugged phosphors. With presently available phosphors, some useful color contrasts can be achieved, particularly if advantage is taken of the property of phosphors of the penetron type whereby an intermediate emission wavelength can be provided by additive emission from a mix of phosphors.

Two potentially useful examples are:

Blue through White to Yellow, as the relative luminance outputs in Blue and Yellow (or red plus green to give the perceptual equivalent of yellow) are changed using different CRT writing speeds or drive, and;

Red through White to Cyan, where Cyan is provided by a green/blue phosphor mix.

A head up display providing a greater color range may be provided by using a CRT having spatially separated areas of different phosphors, for example the flood-gun CRT device described in UK Patent Application No. 8232976 (Agent's Reference JX/6359/02). Provided the emission is restricted to chromatically separated wavebands, for which relevant fringe bands are formed, correctly collimated and overlaid image may be provided. In the case of three primary colors (eg Red/Green/Blue) three fringe band patterns giving a different effective focal length over each waveband are required. Separated areas of a phosphor emitting at each color may be used, or areas of penetron phosphor where a color change is required. Fixed format or matrix arrangements as described in the application referenced above may be used as appropriate. It will be appreciated that a fine pitch shadow mask CRT with red, green and blue emitting phosphors may alternatively be used to provide an object in situations where the performance of such a device under vibration and g-force is acceptable.

Although methods for constructing diffractive optical elements form no part of the present invention, some of the considerations will be discussed so that the invention may be further appreciated.

In diffractive elements with spaced fringe patterns the construction may be substantially conformal, that is the fringe pattern is parallel with the substrate on which the element is formed. One of the fringe patterns may be exactly conformal, while others diverge from conformity to a great or lesser extent dependent upon the focal length difference required. Alternatively all fringe patterns may diverge from conformity, each to a different extent with respect to an average value of fringe pattern curvature. Where the diffractive element is in the object to image light path following collimation physical spacing between the fringe bands may be sufficient. Otherwise the fringe patterns may be formed in a curved substrate.

It will be appreciated that the principles of the present invention are applicable to HUD systems employing either cursively written (as already described) or raster generated objects. In a system having a raster generated object for example, color (eg red) may be added to existing monochrome green roster images. It will be realised that the invention may be readily extended to a full color raster display.

I claim:

1. A head up display system including a light emissive object at an object plane, optics including a collimator and a combiner arranged to provide a collimated image of the object for viewing at an eye plane overlaid on a view through the combiner, the optics being arranged for optimum accuracy over a narrow band of wavelengths characterized in that the object emits light in at least two chromatically separated emission wavebands and by a diffractive optical element in the light path from object plane to eye plane having narrow band reflection characteristics at each emission waveband.

2. A head up display system as claimed in claim 1 and characterized in that the relative intensity of light emitted in each emission waveband is controlled to provide intermediate colors.

3. A head up display system as claimed in claim 1 and characterized in that an object is formed at a different magnification as light in each waveband is emitted.

4. A head up display system as claimed in claim 1 and characterized in that different geometrial correction is applied as light in each waveband is emitted.

5. A head up display system as claimed in claim 1 and including a diffractive optical element exhibiting a different focal length at each emission waveband such that light in each waveband from the object forms a correctly collimated color image at the image plane.

6. A head up display system as claimed in claim 5 and wherein a diffractive optical element exhibiting different focal lengths is constructed by recording spaced apart fringe patterns.

7. A head up display system as claimed in claim 1 and characterized in that the emission wavebands are at two contrasting colors.

8. A head up display system as claimed in claim 1 and characterized in that the emission wavebands are at three primary colors such that intermediate colors may be provided by additive mixing of the primaries.

9. A head up display system as claimed in claim 1 and including a cathode ray tube.

10. A head up display system as claimed in claim 9 and wherein the cathode ray tube has a phosphor of the penetron type.

11. A head up display system as claimed in claim 10 and wherein emission is restricted to wavebands of the penetron phosphor components and intermediate colors achieved by varying the writing speed or electrical drive to the cathode ray tube when each phosphor component is energized.

* * * * *